United States Patent [19]
Jeffries et al.

[11] Patent Number: 6,090,154
[45] Date of Patent: *Jul. 18, 2000

[54] METHOD, APPARATUS AND COMPUTER PROGRAM PRODUCT FOR LINKING STACK MESSAGES TO RELEVANT INFORMATION

[75] Inventors: Robin Jeffries, Palo Alto; David Weatherford, Mountain View; Evan Adams, San Leandro, all of Calif.

[73] Assignee: Sun Microsystems, Inc., Palo Alto, Calif.

[*] Notice: This patent is subject to a terminal disclaimer.

[21] Appl. No.: 09/260,791

[22] Filed: Mar. 1, 1999

Related U.S. Application Data

[60] Division of application No. 08/768,695, Dec. 18, 1996, which is a continuation-in-part of application No. 08/530,595, Sep. 19, 1995, Pat. No. 5,845,120.

[51] Int. Cl.[7] .................................................... G06F 9/445
[52] U.S. Cl. ................................................................ 717/4
[58] Field of Search ................................. 395/704; 717/4

[56] References Cited

U.S. PATENT DOCUMENTS

| | | | |
|---|---|---|---|
| 5,581,684 | 12/1996 | Dudzik et al. | 395/338 |
| 5,644,737 | 7/1997 | Tuniman et al. | 395/352 |
| 5,675,803 | 10/1997 | Preisler et al. | 395/704 |
| 5,845,120 | 12/1998 | Reddy et al. | 395/704 |
| 5,854,925 | 12/1998 | Shimomura | 395/704 |
| 5,893,131 | 4/1999 | Kornfeld | 707/531 |
| 5,956,479 | 9/1999 | McInerney et al. | 395/183.14 |

OTHER PUBLICATIONS

Filipski. A Case Study In Software Portability: The UNIX Symbolic Debugger. ACM. pp. 85–95, Jul. 1985.
Tolmach. Debugging Standard ML Without Reverse Engineering. ACM. pp. 1–12, Mar. 1990.
Holt. Data Descriptors: A Compile–Time Model of Data and Addressing. ACM. pp. 367–389, Jul. 1987.
Robin. Register and Stack Monitoring Logic Analyzer. European Patent Application, Nov. 1987.

*Primary Examiner*—Tariq R. Hafiz
*Assistant Examiner*—Wei Zhen
*Attorney, Agent, or Firm*—Robert P. Sabath; John F. Schipper; Richard E. Bee

[57] ABSTRACT

Methods, apparatus, and computer program products for linking stack messages to information relevant to stack entries and for generating the stack messages by adding link information to the stack messages. The stack messages are displayed to the user without the link information. Portions of the visible stack messages pertaining to the link information are highlighted, and upon selection by the user of the highlighted portion of the stack message, information relevant to the highlighted stack message is automatically displayed, for example, by running an editor, loading the source file corresponding to the message, and displaying the relevant portion of a source file.

40 Claims, 16 Drawing Sheets

Microfiche Appendix Included
(1 Microfiche, 62 Pages)

```
<HTML>
<head>
<title> Stack Window </title>
</head>
<body>
<h2> Stack contents </h2>
<ul>
<li><A HREF = editor : print. c : 3.1>print</A>
<li><A HREF = editor : main. c : 16.1>print upper</A>
<li><A HREF = editor : main. c : 6.1>main</A>
</ul>
</body>
</HTML>
```

FIG. 13

```
<HTML>
<head>
<title> Stack Window </title>
</head>
<body>
<h2> Stack contents </h2>
<ul>
<li><A HREF = editor : print. c : 3.1>print </A> (
    <A HREF = data : print. c : print : arg.1 >char* </A>)
<li><A HREF = editor : print. c : 16.1>| (
    <A HREF = data : main. c : print upper : arg.1 >char* </A>)
<li><A HREF = editor : main. c : 6.1>| (
    <A HREF = data : main. c : main : arg.1 >int </A>)
    <A HREF = data : main. c : main : arg.2 >char** </A>)
</ul>
</body>
</HTML>
```

1420, 1430 (repeated labels)

FIG. 14

METHOD, APPARATUS AND COMPUTER PROGRAM PRODUCT FOR LINKING STACK MESSAGES TO RELEVANT INFORMATION

RELATED APPLICATIONS

This application is a division of Ser. No. 08/768,695 Dec. 18, 1996 which is a continuation-in-part of patent application Ser. No. 08/530,595, entitled "Method and Apparatus for Linking Compiler Error Messages to Relevant Information" filed Sep. 19, 1995, by Achut P. Reddy, Daniel J. O'Leary, Robert B. Jervis, Robin Jeffries and Evan W. Adams, now U.S. Pat. No. 5,845,120, granted Dec. 1, 1998, which is incorporated by reference in its entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

MICROFICHE APPENDIX

A computer program listing for the present invention is set forth in a Microfiche Appendix which is on file in the present patent application. This Microfiche Appendix is comprised of a single microfiche with 62 frames.

FIELD OF THE INVENTION

The present invention relates to a system for debugging a computer program and more particularly to a system for correcting errors in a computer program by special flags linking displayed stack entries to information corresponding to the displayed stack entries.

BACKGROUND OF THE INVENTION

Conventional compilers translate source code into object code for execution by a computer. Many conventional compilers are implemented as software on a conventional computer system, such as the Turbo C++ compiler commercially available from Borland International of Scotts Valley, Calif. running under the MS-DOS operating system commercially available from Microsoft Corporation of Redmond, Wash.

As shown in FIG. 1, a conventional computer system includes a processor 110 coupled to a first storage device 112 such as a memory, and a second storage device 114 such as a disk storage system. A user may interact with the system via a keyboard 116, mouse 118 and a monitor 120. Computer program product reader 107, such as a memory, hard drive, floppy disk drive or CD-ROM drive can is coupled to processor 101 to allow computer readable program code devices 97 such as encoded bits of a computer program product 99 such as a memory, hard disk, floppy disk, CD-ROM or other storage device to be input to processor 101 and stored in memory 108 and/or disk storage 103 for use in controlling the operation of the computer system 109 when computer program product 99 is inserted into slot 98 of computer program product reader 107. An operating system is loaded into memory 108 or disk storage 103 or a combination of memory 108 and disk storage 103 and instructs processor 101 to load and execute compilers or other applications described below. Many conventional compilers or other applications are distributed on computer program products 99, such as diskettes, storage devices such as ROMs or storage devices such as disk storage system 114, each containing computer readable code devices 97 which cause the computer system 109 operate in a particular manner such as is described herein when a copy of the code devices is loaded into the computer system 109.

Many compilers also detect the presence of errors in the source code. Some conventional compilers provide a listing of all errors in the source code to allow the programmer to see many errors simultaneously. FIG. 2 shows the output of one such conventional compiler. Error messages 212, 214 are located in a build output window 210 of the compiler, although other compilers utilize other output display methods. Error messages 212, 214 each instruct the user that a symbol was undefined. This capability allows the programmer to locate and correct several errors simultaneously. For example by defining one symbol, errors corresponding to error messages 212 and 214 may be simultaneously corrected. Thus, similar or related errors may be easily corrected. However, to correct each error, the source code location for each error must be identified to allow the user to view the error. If the meaning or cause of the error 4 is not apparent, the user may have to search information using a help facility. Some compilers assist the use in this process by providing information such as the file name and source code line number to allow the user to locate the error using an editor, or by suggesting a search topic to use to locate the relevant information in the help facility. Error messages 212, 214 provide the file name, line number and search topic for each error. The user may have to start the source code file editor or help facility, and then manually locate the line or topic.

Some compilers, such as the conventional Delphi Pascal compiler commercially available from Borland International of Scotts Valley, Calif., locate errors sequentially, one error at a time. Rather than displaying a large number of errors simultaneously, these compilers utilize an integrated editor to display a portion of the source code containing the first sequential error, highlight the source code line containing the error and display an error explanation at the bottom of the screen. The user corrects one error and directs the compiler to recompile the source code, which recompiles or continues compiling at the location of the corrected error until the next source code error is reached or the compiler completes the compilation successfully.

Both types of editors require the programmer to utilize a separate help facility to locate help information relevant to each error. This makes the process of correcting more difficult errors for which help is required more cumbersome, because the user must run the help facility and locate the most relevant help information.

A stack is stored into memory 108 or disk storage 103 or a combination of both. The processor 101 uses the stack to remember the addresses of programs or instructions that it has executed and local arguments used to invoke a subroutine. When it executes a subroutine, the processor 102 reads the stack to send the arguments for the subroutine. After executing the subroutine, the processor 102 reads the stack to determine the return address in the program invoking the subroutine.

The stack provides the control flow of a program that is used by programmers for debugging the program. However, as configured, the stack insufficiently describes the control flow for the programmer. The stack typically is mapped onto a view of the source code for the program. Most debuggers provide a separate command that allows the programmer to view the source code associated with a particular stack frame.

This type of debugger requires the programmer to select a separate command to display the source code corresponding to the stack frame. This makes the process of debugging errors for which reviewing the stack frame is required more cumbersome, because the user must select the separate command and locate the relevant source code.

SUMMARY OF THE INVENTION

The present invention displays the stack contents that are linked to other information, such as the source code related to the stack frame or the location of additional relevant information. Certain fields in the displayed stack are highlighted, and the user may select the highlighted field using an input device such as a mouse. Upon selection of a field, a program may be executed to load the relevant information and to display information relevant to the user selected stack frame.

Such a capability provides the benefits of the display of the stack contents with the ease of use of automatic source code display and location in response to simple user selection commands and without requiring a user to search source code of stack frames that were not selected.

A BRIEF DESCRIPTION OF THE DRAWINGS

FIG. 13 is a pictorial illustration showing both hidden and visible text in a completed stack display according to an embodiment of the present invention.

FIG. 14 is a pictorial illustration showing both hidden and visible text in a stack according to another embodiment of the present invention.

DETAILED DESCRIPTION OF A PREFERRED EMBODIMENT

Figure 1:
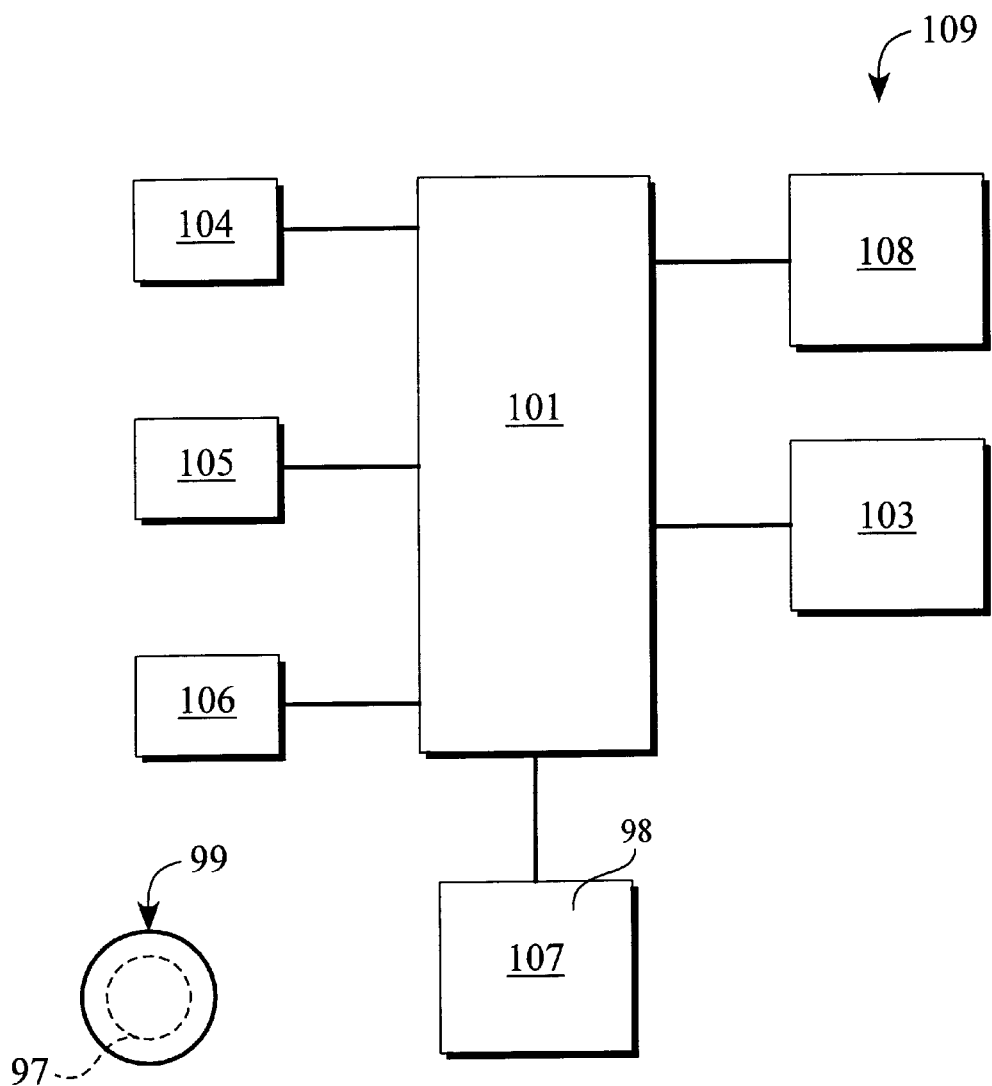
FIG. 1 is a block schematic diagram of a conventional computer system.
Figure 2:
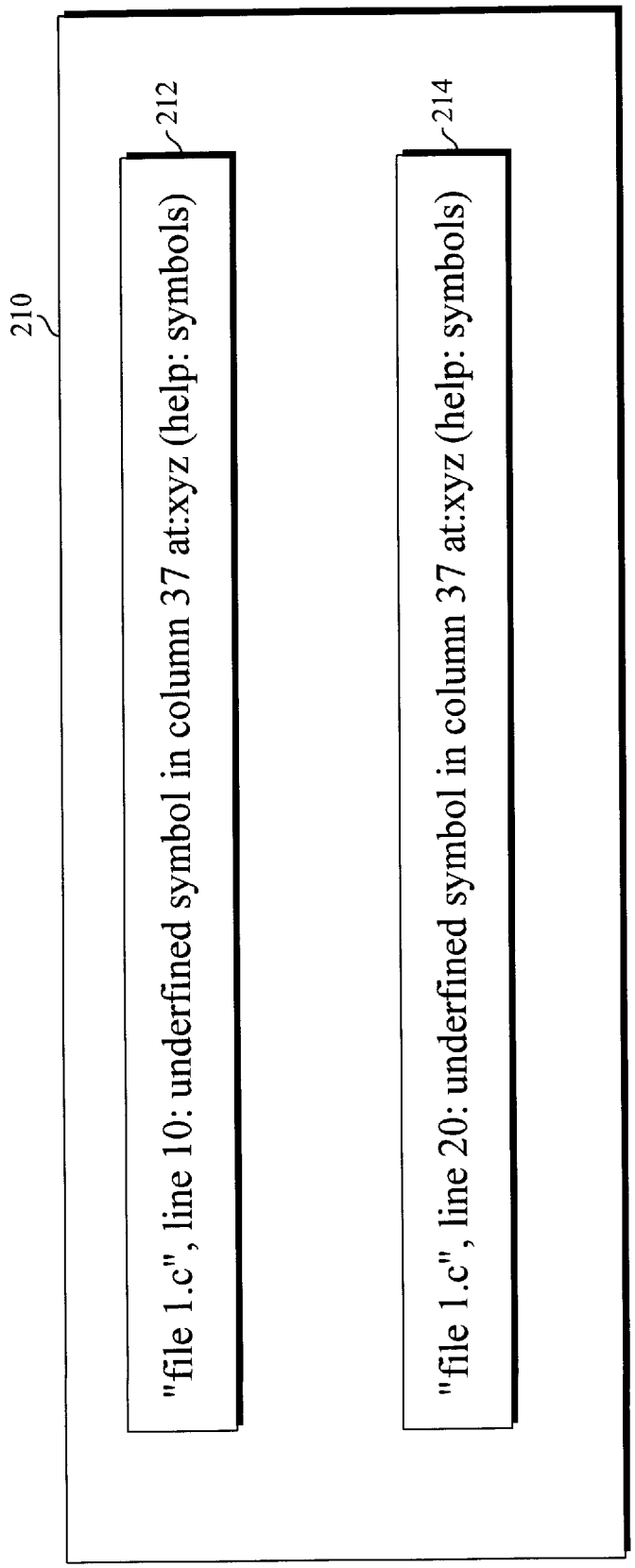
FIG. 2 is a pictorial illustration of an error code display screen of a conventional compiler.

Referring now to FIGS. 1, 2, 3A, 4 and 5, one embodiment of a system 308 for linking compiler-generated error messages with relevant portions of a source code listing and help information is shown. In one embodiment, system 308 is implemented in software and distributed on a computer program product to operate on a conventional computer system such as the computer system 109 shown in FIG. 1. Conventional compiler 310 accepts source files at its input 312 and generates error messages such as the error messages 212, 214 at its output 314.

In one embodiment, filter 320 accepts at its input 322 the error messages from, the output 314 of compiler 310. Scanner 324 scans the error messages to identify the source file and position within the source file of the error, as well as other information relevant to the error. In one embodiment, scanner 324 scans the error message 212, 214 and identifies the file as File1.c by selecting the text in the quotation marks, the line number of the error equal to 10 by selecting the text following the word 'line', and the column number of the error equal to 37 by selecting the text following the word column. Scanner also locates and selects any text within parentheses.

Markup text assembler 326 adds text to be used by the link manager 330 described below from text selected by the scanner 324 described above. In one embodiment, the markup text assembler 336 adds text in the form of hypertext markup language commands, or HTML commands. HTML commands are described in Ray Duncan, *An HTML Primer*, PC Magazine, Jun. 13, 1995 at 261 et. seq. in one embodiment, markup text assembler assembles markup commands corresponding to the selected text. The filename, column and line number selected by scanner 324 are assembled by markup text assembler 326 into markup reference 420.

The text within parentheses is parsed by the links manager 330 to determine the application and parameters to the application which will be used to link the application to the error message, as described below. In one embodiment, a lookup table 327 is used to match the portion of the text in error messages 212, 214 parentheses and before the colon to the application to be used to provide the designated information. In one embodiment the word, 'help' in error messages 212, 214 is matched to the 'help viewer' application, described below. Parameters to be used by the matched application follow the colon. Markup text assembler 326 builds the markup reference 422 by adding the application name from lookup table 327 to a colon and the parameters, if any. Each reference 420, 422, 424, 426 is completed by markup text assembler by adding the characters '<A HREF=' to the beginning of each markup reference 420, 422, 424, 426 and the character '>' to the end of each markup reference 420, 422, 424, 426.

Markup inserter 328 inserts the markup references in appropriate positions within the error messages 212, 214. In one embodiment, markup reference 420 corresponding to the source code file is inserted in front of the error message, and markup reference 422 corresponding to parenthetical statements are inserted prior to the first parenthesis. In one embodiment, markup inserter 328 also inserts the characters '</A>' 430, 432, 434, 436 after the colon following the original position of the line number, and after each closing parenthesis following a parenthetical message, for use as described below. The characters </A> operate as end-of-link identifiers 430, 432, 434, 436. Filter 320 sends the completed messages 440, 444 to the filter output 329.

Figure 3A:
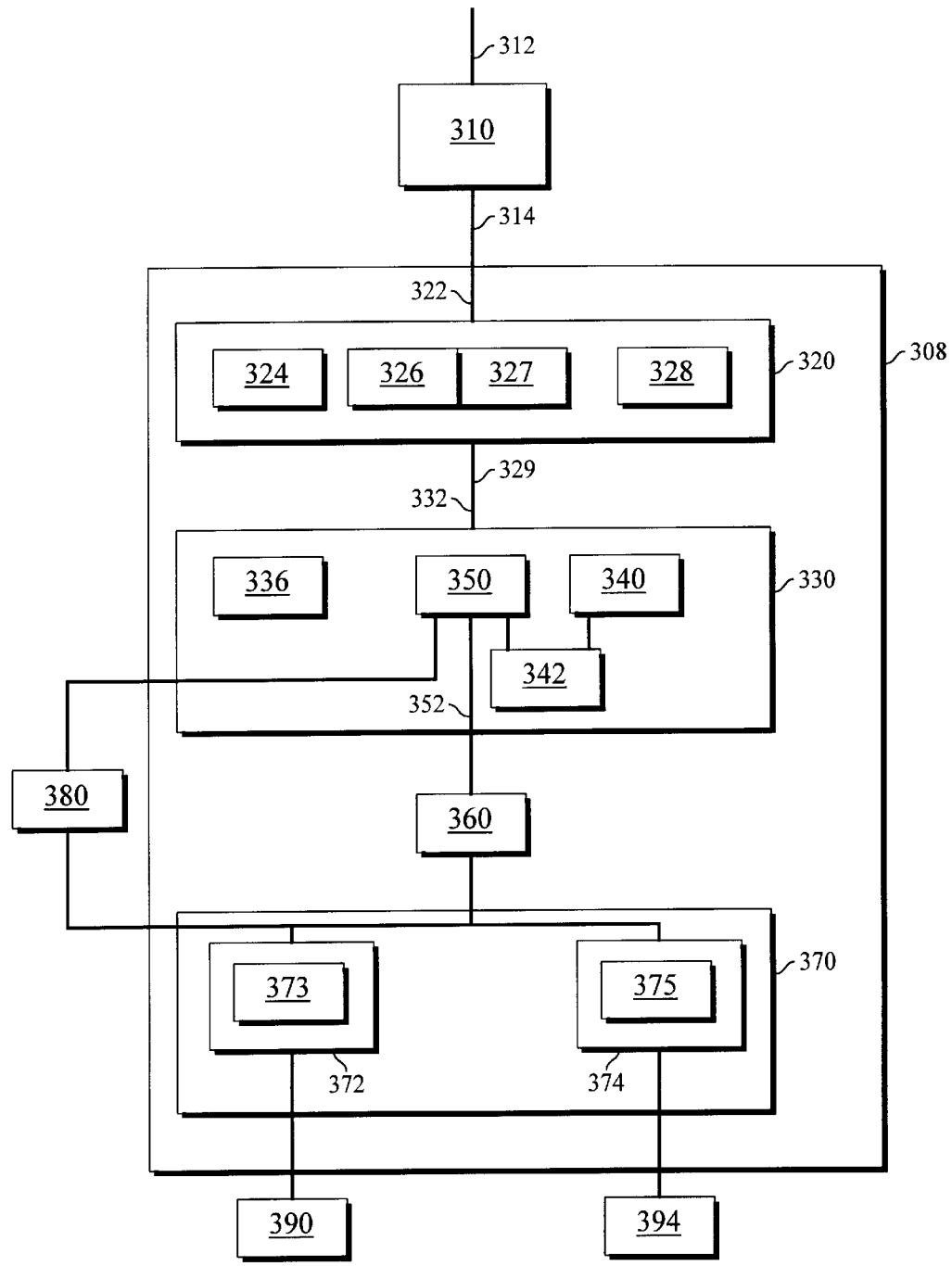
FIG. 3A is a block schematic diagram of an apparatus which relates relevant information to compiler error messages according to one embodiment of the present invention.
Figure 3B:
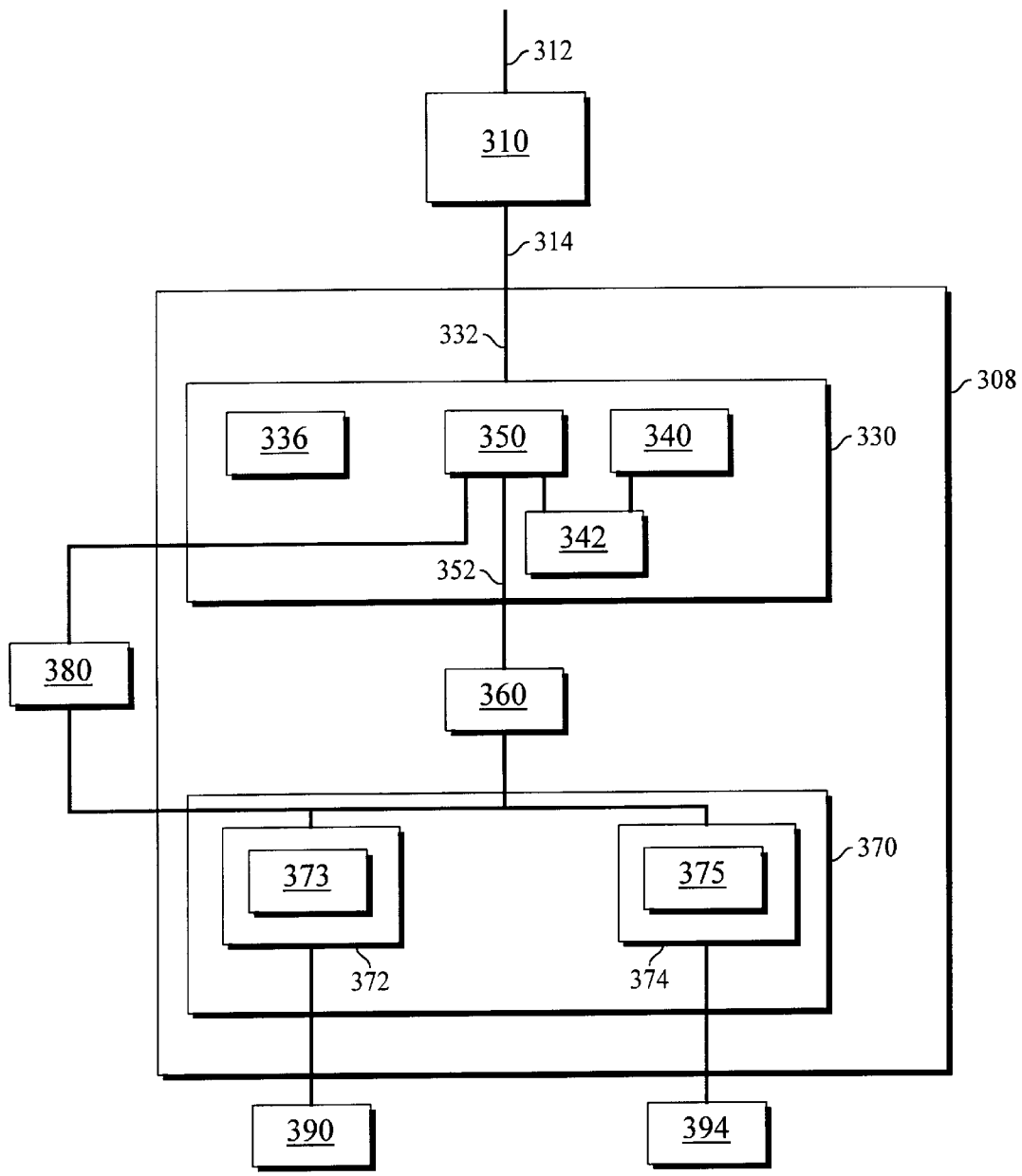
FIG. 3B is a block schematic diagram of an apparatus which relates relevant information to compiler error messages according to another embodiment of the present invention.
Figure 4:
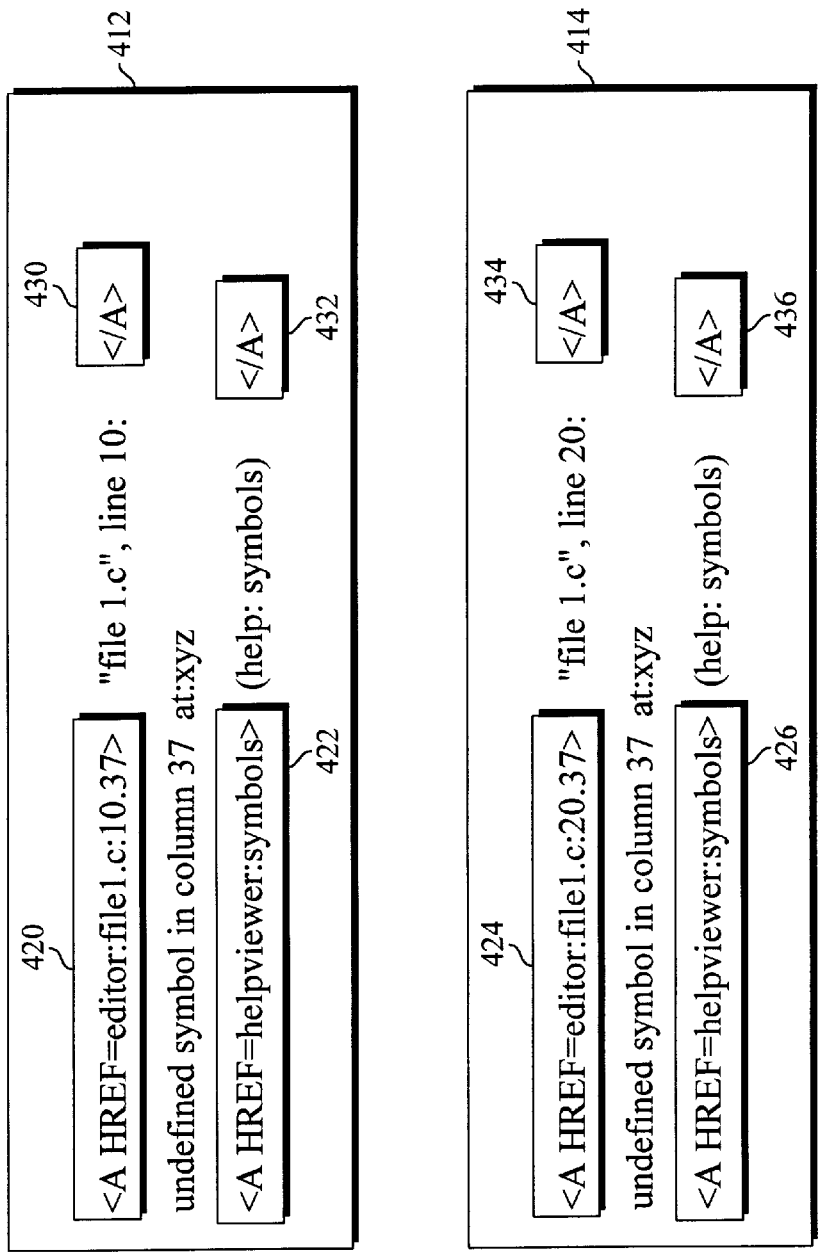
FIG. 4 is a pictorial illustration showing both hidden and visible text in a completed error message according to an embodiment of the present invention.

In one embodiment, compiler 310 generates completed messages 440, 444 and thus filter 320 is necessary. FIG. 3B illustrates this embodiment, and is similar to FIG. 3A except that the filter is not present and the compiler output 314 is coupled directly to the links manager 330, as described below.

Figure 5:
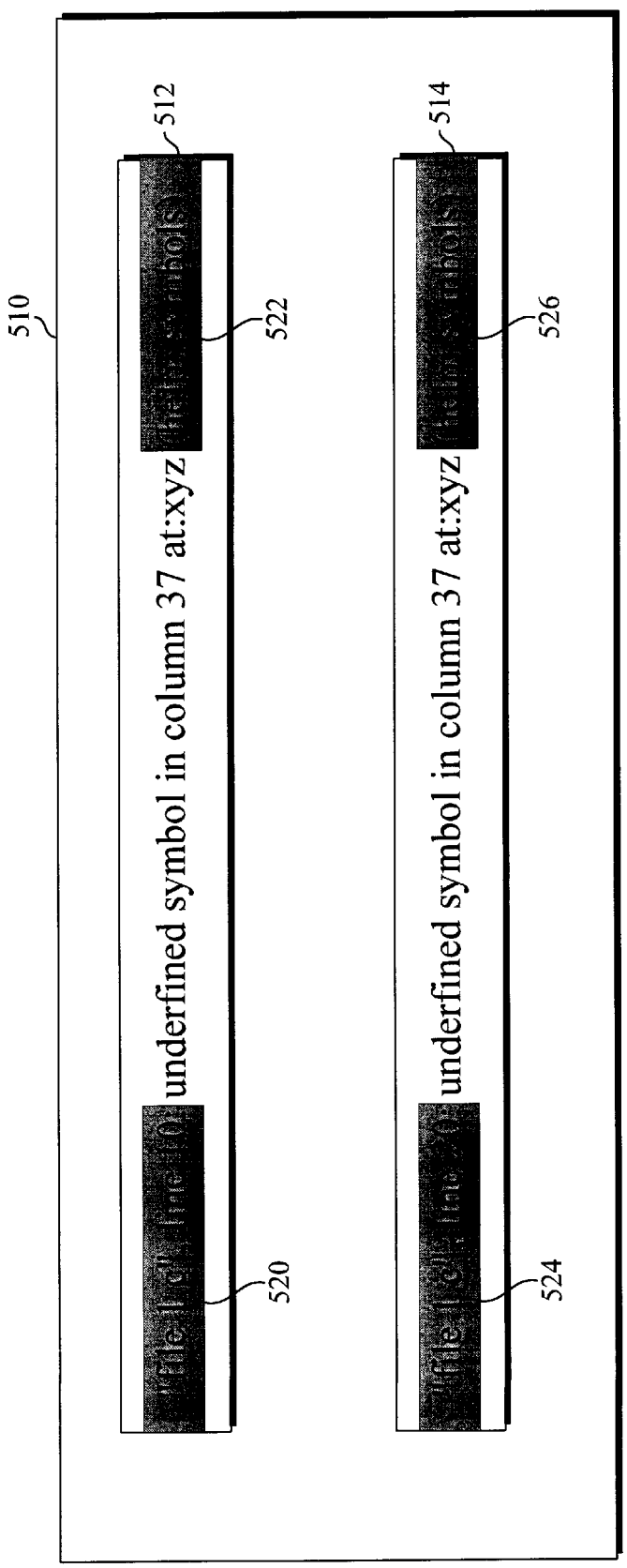
FIG. 5 is a pictorial illustration of a display screen showing visible and highlighted text of an error message display according to one embodiment of the present invention.

Referring now to FIGS. 2, 3A, 4 and 5, in one embodiment, filter output 329 is coupled to the input of links manager 330. Links manager 330 displays and allows the user to interact with links, or highlighted portions 520, 522, 524, 526 of the completed error messages 440, 444 which appear to the user similar to the original error messages 212, 214 with the addition of visual indicators such as highlighted portions 520, 522, 524, 526, or glyphs, which are small pictures. Links scanner 336 scans the text at the links manager input 332 and identifies any markup references 420, 422, 424, 426 and end-of-link identifiers 430, 432, 434, 436. In one embodiment, links renderer 340 displays the completed messages 412, 414 as a linked error message in which markup references 420, 422, 424, 426 are not displayed, and end-of-link identifiers 430, 432, 434, 436 are not displayed, and text 520, 522, 524, 526 between each markup reference 420, 422, 424, 426 and the following end-of-link identifier 430, 432, 434, 436 is highlighted in some fashion, such as by underlining, changing the background color, or both, as shown in FIG. 5. Additionally, or alternatively, a glyph may be displayed near the text 520, 522, 524, 526 to provide a visual indicator. The highlighted text 520, 522, 524, 526, the glyph or both are also known as links 520, 522, 524, 526, while the information pertaining to the link is known as link information 420, 422, 424, 426. The links renderer 340 also maintains a table of links positions 342 containing the screen coordinates of each link 520, 522, 524, 526. Links renderer 340 also displays a window 510 and allows the user to interact with the window 510 by responding to scrolling and other commands for the display of the error messages 512, 514 in the window 510.

Links activator 350 is coupled to receive mouse button and position messages from the operating system 380. When a mouse button down message is received by links activator 350, it identifies the location of the mouse using position messages from the operating system and determines if the mouse is positioned over a link 520, 522, 524, 526 using the table of links positions 342 described above.

If the user has pressed and released a mouse button while the mouse is positioned over a link 520, 522, 524, 526, the markup reference 420, 422, 424, 426 preceding the link 520, 522, 524, 526 is sent by links activator 350 via output 352 to address resolver 360 which separates the parameters of a multiple parameter markup reference such as the editor markup references 420, 424, determines the application 394 or editor 390 corresponding to the link and calls the module 372, 374 corresponding to the application or editor, sending the separated parameters as parameters to the modules 372, 374.

Each module 372, 374 in control manager 370 operates an application 394 or editor 390 based upon the link 520, 522, 524, 526 selected by the user s described above. In one embodiment, if address resolver 360 receives a markup reference 420, 424 corresponding to the line number of the compiler source file, address resolver 360 calls editor control module 372 to run the editor 390 if the editor 390 is not already running, load the source file if it is not already loaded, display the line number indicated in the markup reference 420, 424 and position the editor cursor at the column number indicated in the markup reference 420, 424 to the right of the period. Editor control module 372 assembles the proper commands and sends it to the operating system 380 to start the editor, or to the editor 390 to load the source file or position the cursor and display the desired line number. In one embodiment, the operating system 380 is the SPARCSystem operating system commercially available from Sun Microsystems, Inc. of Mountain View, Calif., and the operating system call to run the editor 390 execvp. In one embodiment, editor 390 is a conventional XEMACS editor, adapted as described below, and the commands to load a file and display a line number are eserve-load-file, and eserve-goto-lineno, respectively, implemented in XEMACS as described below. In one embodiment, the sequence listed in Appendix 1 is stored into a disk file in directory/home/user1/elisp, in the file ebo.el. The sequence is loaded into the conventional XEMACS editor to adapt it to perform the eserve-load-file, and eserve-goto-lineno commands using the following two XEMACS commands:

(setq load-path (append load-path '("/opt/SUNWspro/lib")))
   (load "/home/user1/elisp/ebo.el")

In one embodiment, editor control module 372 maintains the status of the editor 390 in a status list 373 to allow for the determination of whether to start the editor or load the file based upon previous commands the editor control module 372 sent to the editor 390. If the editor 390 terminates without a command from the editor control module 372, editor control module 372 will update its status list 373 based upon operating system messages received when editor control module 372 next attempts to communicate with editor 390.

In one embodiment, if address resolver 360 receives a markup reference 422, 426 corresponding to the help viewer 394, address resolver 360 calls help control module 374 to run the help viewer 394 if not already running, and to display a portion of the help information indicated by the parameter sent from address resolver 360. Help control module 374 assembles and sends the command to the operating system 380 to load the help viewer 394 if necessary, and assembles and sends to the help viewer 394 the command to display the information as indicated by the parameter received from the address resolver 360, as described above. In one embodiment, the operating system 380 is the conventional Solaris™ operating system commercially available from Sun Microsystems, Inc., of Mountain View, Calif., the help viewer is a dynamically loaded shared library, such as libDtHelp.so contained in CDE 1.0 available from Sun Microsystems of Mountain View, Calif. and the command to load the help viewer 394 is dlopen("libDtHelp.so.1", RTLD_LAZY). In such an embodiment, subsequent commands used to direct the help viewer 394 to display help information are made using function calls to the shared library, such as the libDtHelp.so void function HelpOnTopic, containing the parameters "parent" of type Widget, containing a handle to the help control module 374 and "clientdata" containing a pointer to a text string containing the keyword from which to locate the help information. In help messages 512, 514 the keyword is located to the right of the colon in text 522, 526 and is "symbols".

Figure 6:
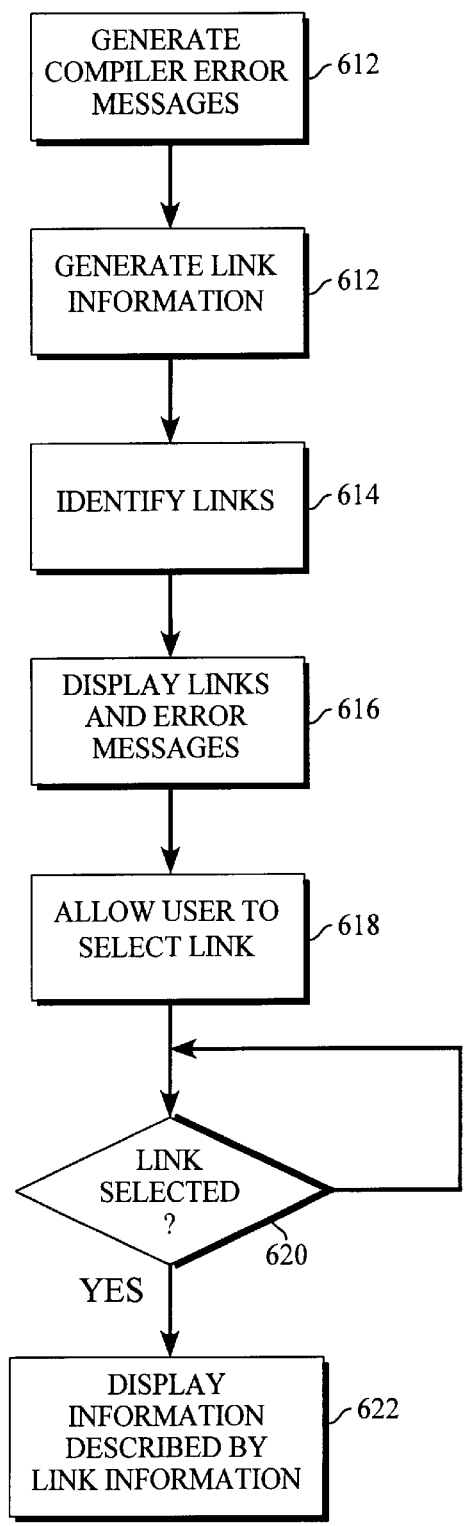
FIG. 6 is a flowchart illustrating a method of associating relevant information with compiler error messages according to one embodiment of the present invention.

Referring now to FIG. 6, one embodiment of a method of linking compiler error messages to relevant information is shown. Compiler error messages and link information are generated 610, 612. The link information may be generated after all of the compiler errors are generated or may be generated simultaneously with the generation of the compiler errors. In one embodiment, error messages are codes, and in another embodiment, error messages contain explanatory text as described above. In one embodiment the link information includes identifiers for an application, or identifiers for information such as source code file name, line numbers and column numbers, or help file indices.

Links are identified and displayed along with the error messages 614, 616. In one embodiment, links are displayed by highlighting a portion of the error messages corresponding to the link, although in other embodiments, any displayed indicator of the link is sufficient. The user is allowed to select a link 618, and if selected 620, the information described by the link information is displayed 622.

Figure 7:
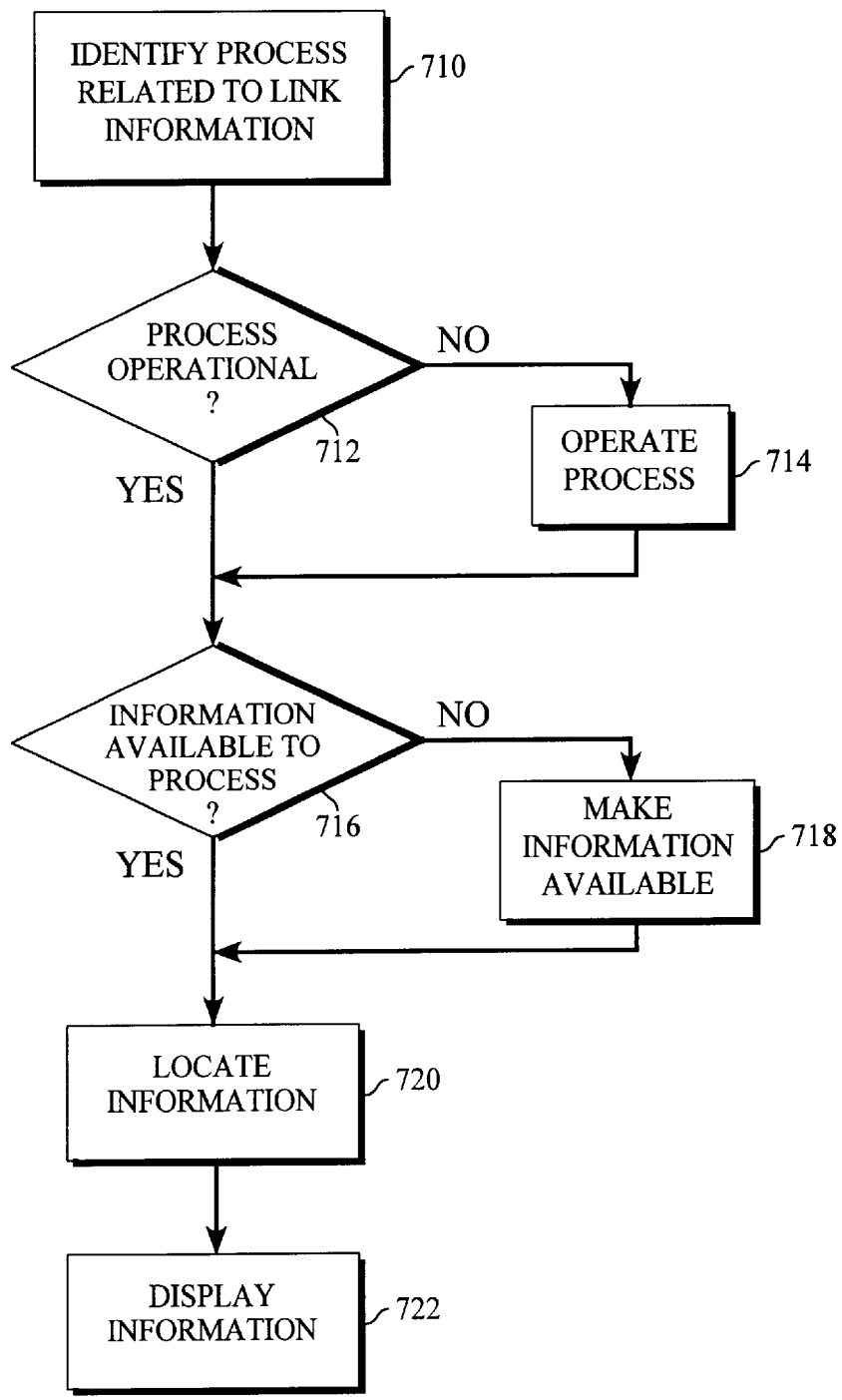
FIG. 7 is a flowchart of a method display information described by link information according to one embodiment of the present invention.

Referring now to FIG. 7, one embodiment of a method of displaying information described by link information is shown. A process related to the link information is identified from the link information 710. In one embodiment, processes include an editor and a help viewer. If the process is not operational, it is made operational 712, 714. If the information specified by the link information is not available to the process, such information is made available to the process 716, 718. In one embodiment, the information is located in a file, which is unavailable if the file is not opened by the process, and made available by generating and sending a command to the process to open the file. At least a part of the information specified by the link information is located and displayed 720, 722.

Figure 8:
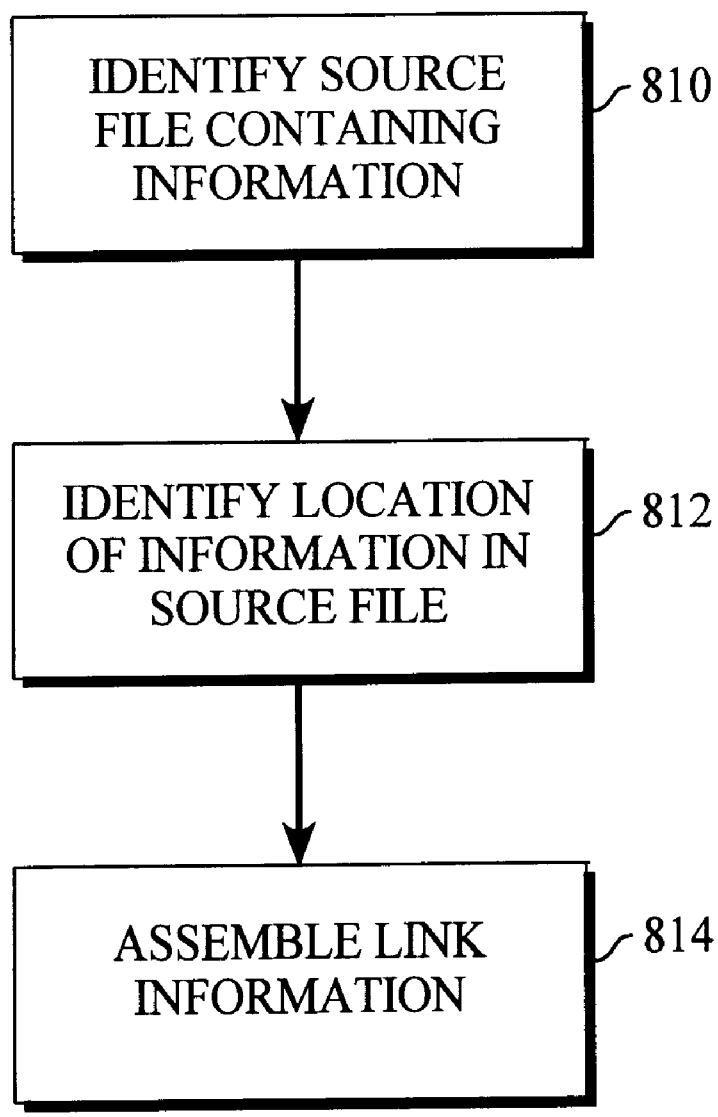
FIG. 8 is a flowchart illustrating a method of generating link information from a compiler error message according to one embodiment of the present invention.
Figure 9:
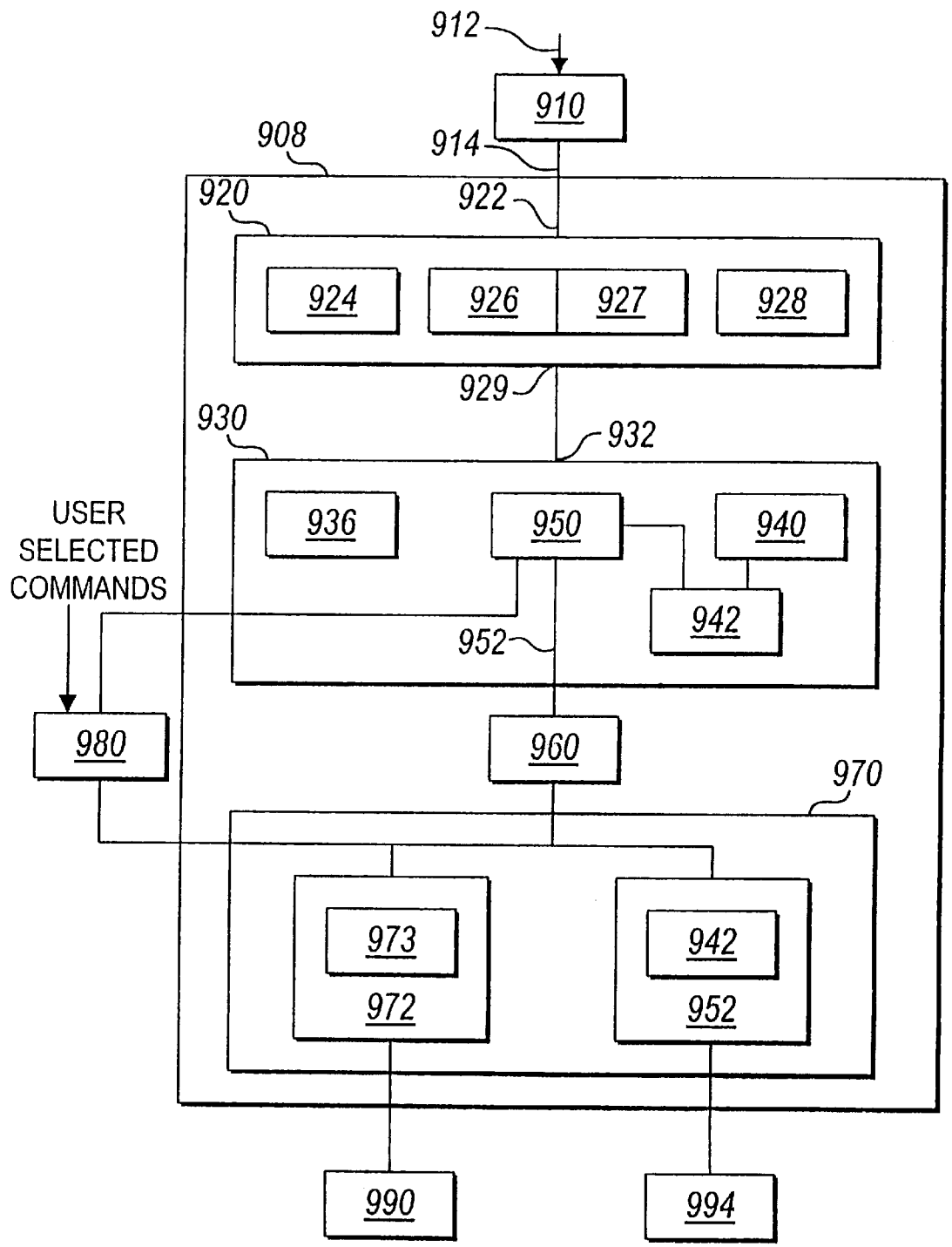
FIG. 9 is a block schematic diagram of an apparatus which relates relevant information to stacks according to another embodiment of the present invention.
Figure 10:
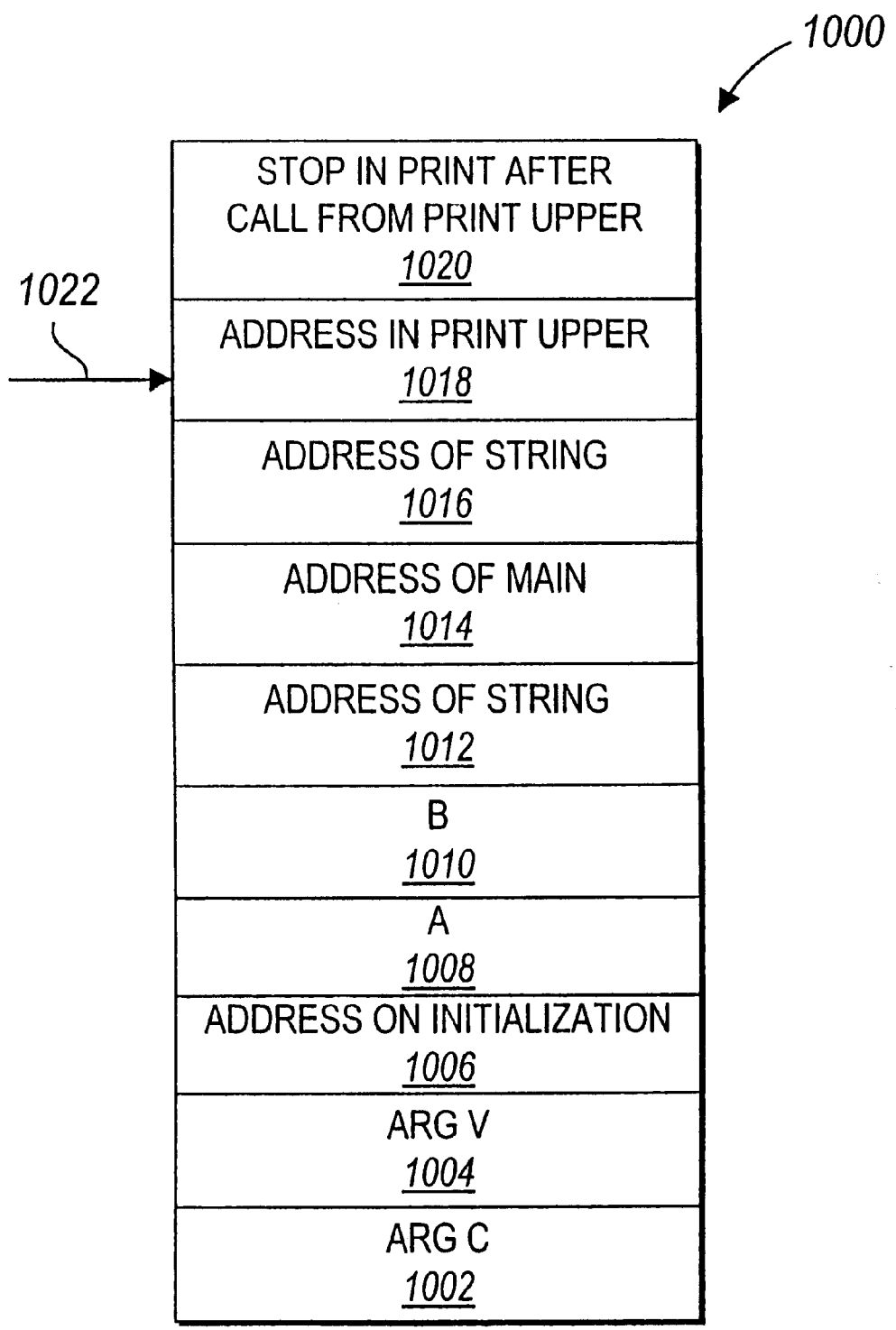
FIG. 10 is a pictorial illustration of the stack contents according to one embodiment of the present invention.

Referring now to FIG. 8, a method of generating link information from the compiler error message is shown. The name of a source file and location of certain information in the source file is identified from the compiler error message 810, 812, and the link information is assembled 814. In one embodiment, the name of the source file is inferred from the name of an application.

Referring now to FIGS. 1, 9, 10, 11, and 13, one embodiment of a system 908 for linking displayed stack information with relevant portions of the stack is shown. In one embodiment, system 908 is implemented in software and distributed on a computer program product to operate on a conventional computer system such as the computer system 109 shown in FIG. 1. Conventional compiler 910 accepts source files at its input 912 and generates a stack 1000 at its output 914. The stack 1000 stores the addresses of programs or instructions that the processor 101 has executed and local arguments, used to invoke a subroutine.

The stack 1000 includes entries 1002, 1004, 1006, 1008, 1010, 1012, 1014, 1016, 1018, and 1020 that contain the arguments used when a subroutine is invoked and the return addresses to which the processor 101 returns after executing the subroutine. Table I shows an exemplary main program that invokes a print program shown in Table II. As it executes, the computer program enters the arguments and return addresses in the stack 1000. For example, the main program enters the arguments 'v' and 'c' into entries 1002, 1004 and enters the address of initialization in entry 1006. The variables 'a', 'b' and the address of the character string are entered into entries 1008, 1010, 1012, respectively.

TABLE I

1. Main (int argc, char**arv)
2. {
3. int a,b;
4. Char string[ ] = "Hello world\n";
5.
6. print upper (char * string);
7. }
8.
9. print upper (char * string)
10. {
11. char * ptr;
12.
13. For (ptr=string; *ptr!=0; ptr++)
14. *ptr = upper (*ptr);
15.
16. print (string);
17. }

TABLE II 1. print (char * string)
2. {
3. // stop her on entry
4. ;
n. }

When the main program invokes the print upper. program, the address of this instruction is entered into the entry 1014. After the print upper program is executed, the program returns to the address stored in entry 1014. The address of the character string executed by the print program is stored in entry 1016, and the return address to the print upper program is stored in entry 1018. After print, the stop command in the print upper program is stored in entry 1020. A stack pointer 1022 tracks the entry in the stack 1000.

In one embodiment, filter 920 accepts at its input 922 the stack 1000 from the output 914 of compiler 910. Scanner 924 scans each entry of the stack 1000 to identify the source file and address within the source file of the entry, as well as other information relevant to the entry. In one embodiment, scanner 924 scans the entry 1014 and identifies the file as main.c by the address in the entry 1014. Scanner 924 also locates and selects any text associated with the entry.

Markup text assembler 926 adds text to be used by the link manager 930 described below from text selected by the scanner 924 described above. In one embodiment, the markup text assembler 936 adds text in the form of hypertext markup language commands, or HTML commands. In one embodiment, markup text assembler 926 assembles markup commands corresponding to the selected text. The filename, column and line number selected by scanner 924 are assembled by markup text assembler 926 into markup reference 1320.

The text within parentheses is parsed by the links manager 930 to determine the program and parameters to the program which will be used to link the program to the stack, as described below. In one embodiment, a lookup table 927 is used to match the address of instructions to the program containing the instructions. The instruction to be used by the matched application follow the colon. Markup text assembler 926 builds the markup reference 1320 by adding the application name from lookup table 927 to a colon and the parameters, if any. Each reference 1320 is completed by markup text assembler 926 by adding the characters '<A HREF=' to the beginning of each markup reference 1320 and the character '>' to the end of each markup reference 1320.

Markup inserter 928 inserts the markup references in appropriate positions within the display messages 1102, 1104, 1106, 1108, 1110. In one embodiment, markup inserter 928 also inserts the characters '</A>' 1330 after the colon following the original position of the line number, and after each closing parenthesis following a parenthetical message, for use as described below. The characters </A>operate as end-of-link identifiers 1330. Filter 920 sends the completed messages 440, 444 to the filter output 929.

Figure 11:
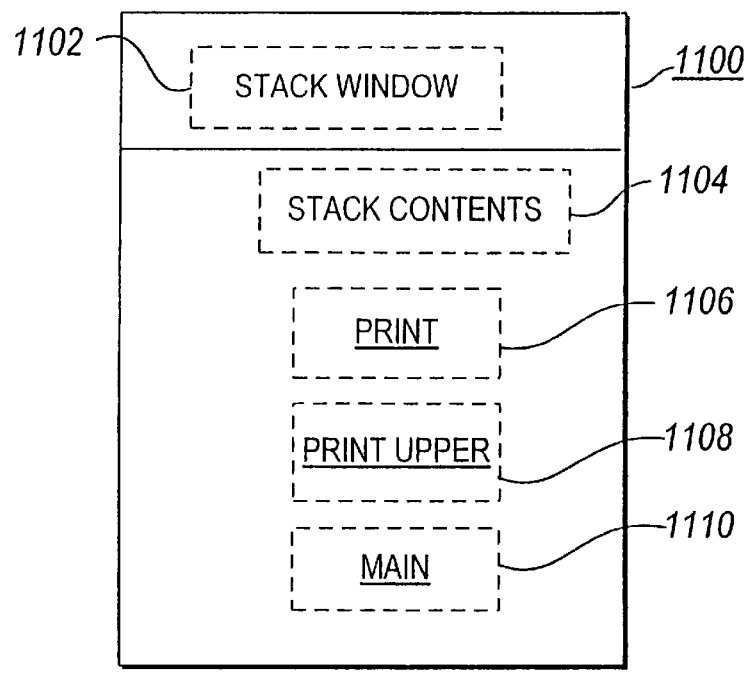
FIG. 11 is a pictorial illustration of a display screen showing linked entries of the stack contents according to one embodiment of the present invention.

Filter output 929 is coupled to an input 932 of links manager 930. Links manager 930 displays and allows the user to interact with links which may also include visual indicators such as highlighted portions or glyphs. Links scanner 936 scans the text at the links manager input 932 and identifies any markup references 1320 and end-of-link identifiers 1330. In one embodiment, links renderer 940 displays the completed stack display 1100 as a linked message in which markup references 1320 are not displayed, and end-of-link identifiers 1330 are not displayed, and text 1102, 1104, 1106, 1108, 1110 between each markup reference 1320 and the following end-of-link identifier 1330 is highlighted in some fashion, such as by underlining, changing the background color, or both, as shown in FIG. 11. Additionally, or alternatively, a glyph may be displayed near the text 1102, 1104, 1106, 1108, 1110 to provide a visual indicator. The highlighted text 1102, 1104, 1106, 1108, 1110, the glyph or both are also known as links 1102, 1104, 1106, 1108, 1110, while the information pertaining to the link is known as link information 1320. The links renderer 940 also maintains a table of links positions 942 containing the screen coordinates of each link 1320. Links renderer 940 also displays a window 1100 and allows the user to interact with the window 1100 by responding to scrolling and other commands for the display of the entries 1102, 1104, 1106, 1108, 1110 in the window 1110.

Links activator 950 is coupled to receive mouse button and position messages from the operating system 980. When a mouse button down message is received by links activator 950, it identifies the location of the mouse using position messages from the operating system and determines if the mouse is positioned over a link 1106, 1108, 1110 using the table of links positions 942 described above.

If the user has pressed and released a mouse button while the mouse is positioned over a link 1106, 1108, 1110, the markup reference 1320 preceding the link 1106, 1108, 1110 is sent by links activator 950 via output 952 to address resolver 960 which separates the parameters of a multiple parameter markup reference such as the markup references 1320, determines the application 994 or editor 990 corresponding to the link and calls the module 972, 974 corresponding to the application or editor, sending the separated parameters as parameters to the modules 972, 974.

Each module 972, 974 in control manager 970 operates an application 994 or editor 990 based upon the link 1106, 1108, 1110 selected by the user as described above. In one embodiment, if address resolver 960 receives a markup reference 1320 corresponding to the line number of the compiler source file, address resolver 960 calls editor control module 972 to run the editor 990 if the editor 990 is not already running, load the source file if it is not already loaded, display the line number indicated in the markup reference 1320 and position the editor cursor at the column number indicated in the markup reference 1320 to the right of the period. Editor control module 972 assembles the proper commands and sends it to the operating system 980 to start the editor, or to the editor 990 to load the source file or position the cursor and display the desired line number. In one embodiment, the operating system 980 is the SPARC-System operating system commercially available from Sun Microsystems, Inc. of Mountain View, Calif. In one embodiment, editor 990 is a conventional XEMACS editor.

Figure 12:
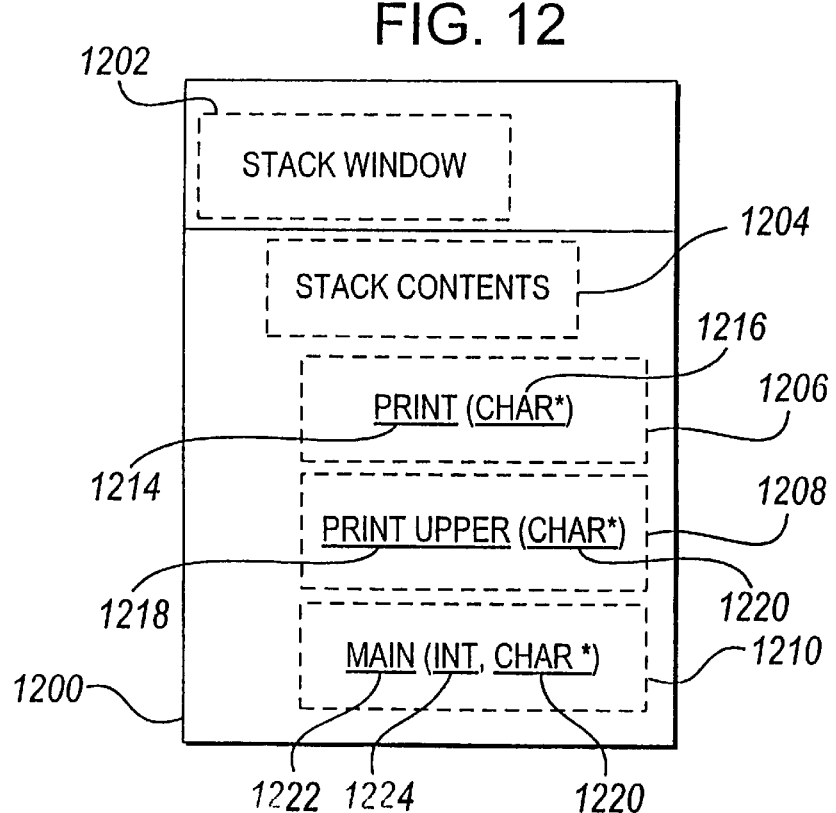
FIG. 12 is a pictorial illustration of a display screen showing linked entries of the stacked contents according to another embodiment of the present invention.

Referring now to FIGS. 12 and 14, another embodiment of a display screen showing linked entries and of hidden and visible text, respectively. Markup inserter 928 inserts the markup references in appropriate positions with the display messages 1202, 1204, 1206, 1208, and 1210. The markup inserter 928 inserts the characters '</A>' 1330 which operate as end-of-link identifiers 1330. The display messages 1204, 1206, 1208, and 1210 include linked text 1214, 1218, and 1220, which are linked to corresponding programs and subroutines and also include linked text 1216, 1220, 1224, and 1226, which are linked to the instructions that initialize the variables associated with the text. The text includes markup references 1420 and 1430. The markup references 1420 are similar to the markup references 1320 described above, and processed similarly by the system 908. The markup reference 1430 provides a reference to variables used by the program. The links renderer 940 maintains a table of link positions 942 containing the screen coordinates of each link 1430. These links allow the user to interact with the links 1430 in a manner similar to the links 1330, as described above. In response to a user input, such as a mouse button down message, the links activator 950 identifies the location of the mouse using position messages from the operating system 980 and determines if the mouse is positioned over a link 1216, 1218, 1220, 1222, 1224, 1226 using the table of links position 942 described above.

If the user has pressed and released a mouse button while the mouse is positioned over a link 1214, 1216, 1218, 1220, 1222, 1224, 1226, the markup reference 1420 preceeding the link is sent by links activator 950 via output 952 to address resolver 960 which separates the parameters of a multiple parameter markup reference such as the markup references 1420, determines the variable corresponding to the link and calls the module 972 corresponding to the variable, sending the separated parameters as parameters to the module 972. The module searches the source code to determine the code that initialized the selected variable. The control module 972 displays the desired line number.

Figure 15:
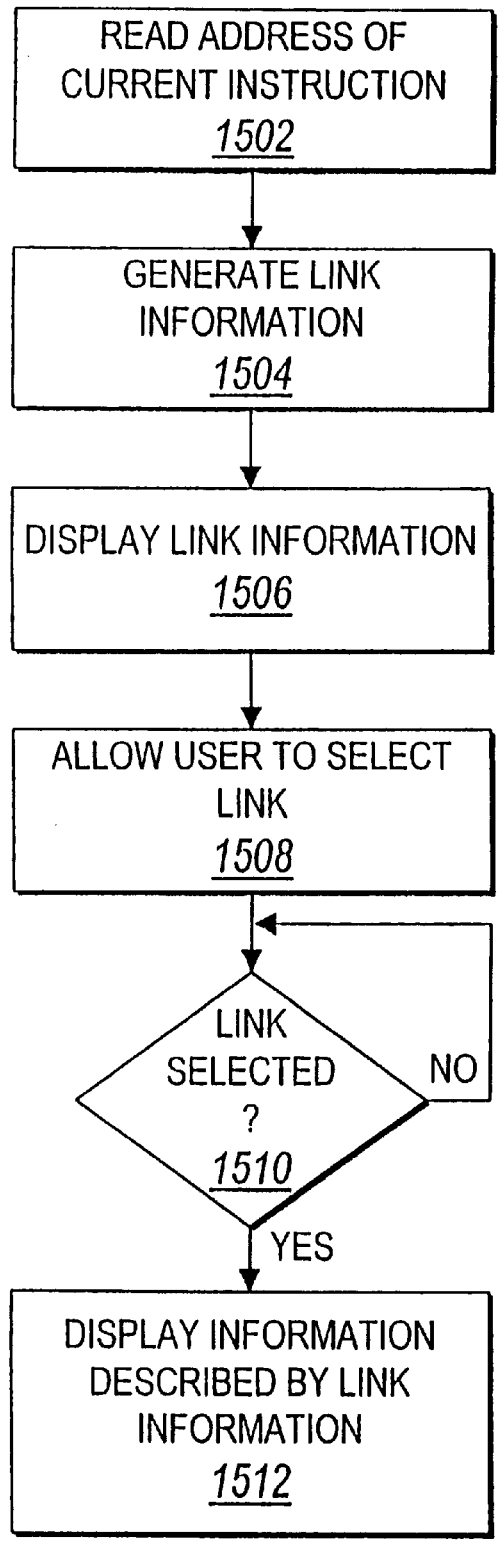
FIG. 15 is a flow chart illustrating a method associating relevant information with stack contents according to one embodiment of the present invention.

Referring now to FIG. 15, one embodiment of a method of linking stack information to relevant information is shown. The address of the current instruction is read 1502. The stack display link information is generated 1504. The link information may be generated after all of the stack entries are read or may be generated simultaneously with the reading of the stack entries. In one embodiment, the displayed stack does not include variables (see FIG. 11), and in another embodiment, the displayed stack includes variables (see FIG. 12). In one embodiment, the displayed stack includes explanatory text as described above. In one embodiment the link information includes identifiers for an application, or identifiers for information such as source code file name, line numbers and column numbers, or help file indices.

Links are displayed 1506. In one embodiment, links are displayed by highlighting a portion of the program name corresponding to the link, although in other embodiments, any displayed indicator of the link is sufficient. The user is allowed to select a link 1508, and if selected 1510, the information described by the link information is displayed 1512.

Referring now to FIG. 7, one embodiment of a method of displaying information described by link information is shown. A process related to the link information is identified from the link information 710. In one embodiment, processes include an editor and a help viewer. If the process is not operational, it is made operational 712, 714. If the information specified by the link information is not available to the process, such information is made available to the process 716, 718. In one embodiment, the information is located in a file, which is unavailable if the file is not opened by the process, and made available by generating and sending a command to the process to open the file. At least a part of the information specified by the link information is located and displayed 720, 722.

Figure 16:
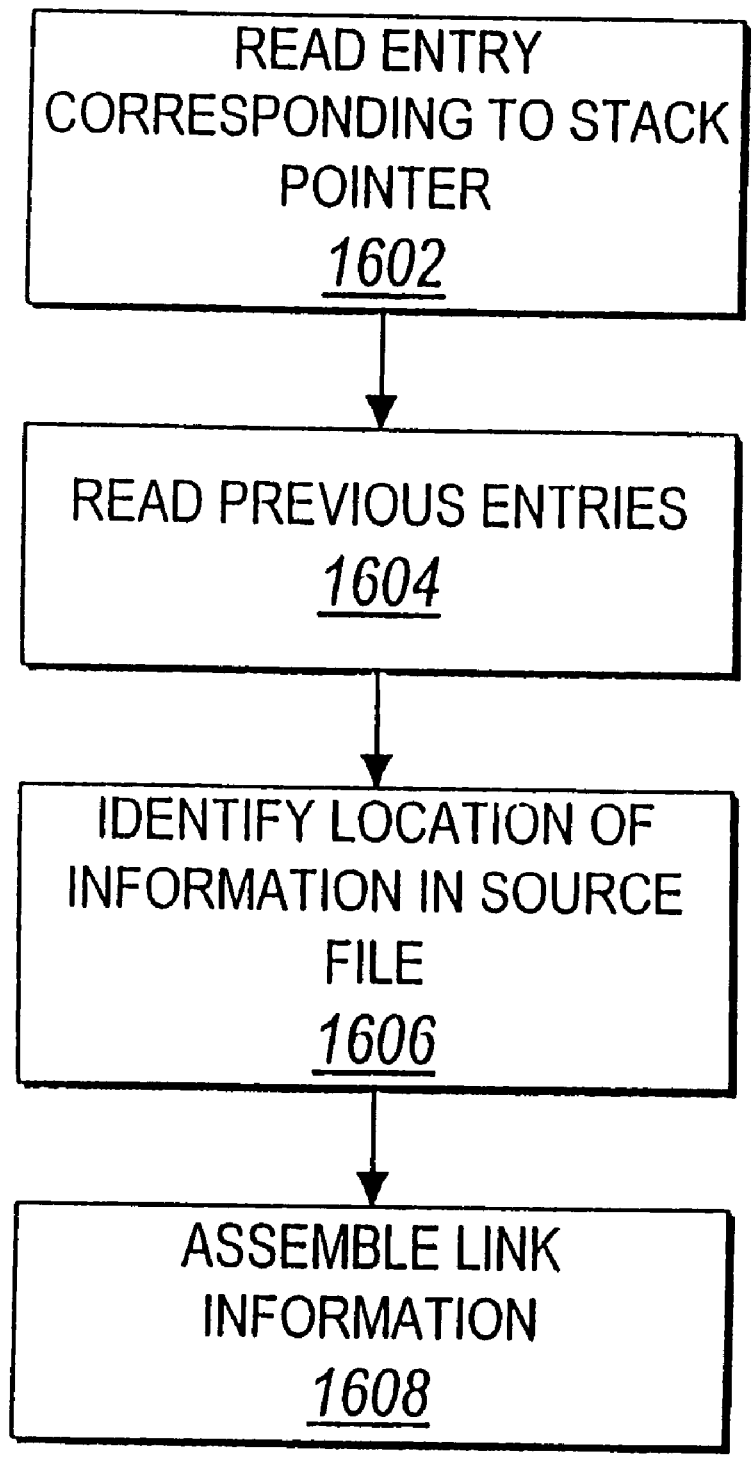
FIG. 16 is a flow chart illustrating a method of generating link information for a stack entry according to one embodiment of the present invention.

Referring now to FIG. 16, a method of generating link information from the compiler error message is shown. The entry of the stack 1000 corresponding to the stack pointer 1022 is read 1604. The previous entries of the stack 1000 below the stack pointer 1022 are read 1604. In particular, addresses in the stack 1000 are read to determine the address in the previously called routine where the program is to return at the end of the current routine. If the entry is a variable, the address of the location where the variable is declared is determined 1504. The name of a source file and location of certain information in the source file is identified from the stack entry 1601, and the link information is assembled 1608. In one embodiment, the name of the source file is inferred from the name of an application.

What is claimed is:

1. A method for directing a program to display information relevant to at least a first portion of a stack entry message selected by a user, the method comprising generating link information responsive to the stack entry message, the link information comprising at least one location of information relevant to the stack entry message;

dividing the stack entry message into at least one second portion;

associating at least one of the second portions of the divided stack entry message with link information;

accepting input from a user to designate at least one of the second portions of the divided stack entry message; and sending the program location of relevant information associated with the second portion of the stack entry message designated.

2. The method of claim 1 wherein at least one location of information relevant to the stack entry message comprises a program identifier.

3. The method of claim 2 wherein at least one location of information relevant to the stack entry message comprises a file identifier and a file location information.

4. The method of claim 3 wherein the file location information comprises a file line number.

5. The method of claim 4 wherein the file location information additionally comprises a file column number.

6. The method of claim 1 further comprising displaying the stack entry message to the user.

7. The method of claim 6 wherein the displaying step comprises highlighting at least one third portion of the divided stack entry message.

8. The method of claim 7 wherein the accepting step comprises receiving user pointing device status information.

9. The method of claim 8 comprising the additional step of identifying at least one display location of at least one displayed fourth portion of the divided stack entry message.

10. The method of claim 9 comprising the additional step of relating the user pointing device status information received to the display location of at least one displayed fourth portion of the divided stack entry message identified.

11. A computer program product comprising a computer usable medium having computer readable code embodied therein for directing a program to display information relevant to at least a first portion of at least one stack entry message selected by a user, the computer program product comprising:

computer readable program code devices configured to cause a computer to generate link information responsive to at least one stack entry message, the link information comprising at least one location of information relevant to the stack entry message;

computer readable program code devices configured to cause the computer to divide at least one of the stack entry messages into at least one second portion;

computer readable program code devices configured to cause the computer to associate at least one second portion of the divided stack entry message with at least a portion of the link information generated;

computer readable program code devices configured to cause the computer to accept input from a user to designate at least one of the second portions of the divided stack entry messages; and computer readable program code devices configured to cause the computer to send the program the location of the relevant information associated with the second portion of the stack entry message designated.

12. The computer program product of claim 11 wherein at least one location of information relevant to the stack entry message comprises a program identifier.

13. The computer program of claim 12 wherein at least one location of information relevant to the stack entry message comprises a file identifier and file location information.

14. The computer program product of claim 13 wherein the file location information comprises a file line number.

15. The computer program product of claim 14 wherein the file location information additionally comprises a file column number.

16. The computer program product of claim 11 additionally comprising computer readable program code devices configured to cause the computer to display the stack entry message to the user.

17. The computer program product of claim 16 wherein the computer readable program code devices configured to cause the computer to display the stack entry message to the user comprise computer readable program code devices configured to cause the computer to highlight at least one third portion of the divided stack entry message.

18. The computer program product of claim 17 wherein the computer readable program code devices configured to cause the computer to accept input from a user to designate at least one of the third portions of the divided stack entry messages comprises computer readable program code devices configured to receive user pointing devices status information.

19. The computer program product of claim 11 additionally comprising computer readable program code devices configured to cause the computer to identify at least one display location of at least one displayed fourth portion of at least one divided stack entry message.

20. The computer program product of claim 19 additionally comprising computer readable program code devices configured to cause the computer to relate the user pointing device status information received to the display location of at least one displayed fourth portion of at least one divided stack entry message identified.

21. A method for directing a program to display information selected by a user and relevant to a stack entry message, the method comprising:

generating link information responsive to a stack entry message, the link information comprising the locations of information relevant to portions of the stack entry message;

dividing the stack entry message into portions;

associating the stack entry portions with link information;

accepting input from a user to designate at least one of the stack entry portions; and sending the program the location of the relevant information associated with the designated stack entry portion.

22. The method of claim 21 wherein at least one message comprises a program identifier.

23. The method of claim 21 wherein at least one location of information relevant to the stack entry message comprises a file identifier and file location information.

24. The method of claim 23 wherein the file location information comprises a file line number.

25. The method of claim 24 wherein the file location information additionally comprises a file column number.

26. The method of claim 21 further comprising displaying the stack entry message to the user.

27. The method of claim 26 wherein the displaying step comprises highlighting a portion of the stack entry message.

28. The method of claim 26 comprising the additional step of identifying the display location of at least one displayed portion of the stack entry message.

29. The method of claim 21 wherein the accepting step comprises receiving user pointing device status information.

30. The method of claim 29 comprising the additional step of relating user pointing device status information to the display location of at least one displayed portion of the stack entry message.

31. A computer program product for directing a computer program to display information relevant to a portion of a stack entry message selected by a user, the computer program product comprising:

program code configured to cause a computer to generate link information responsive to a stack entry message, the link information comprising the locations of information relevant to portions of the stack entry message;

program code configured to cause the computer to divide the stack entry message into portions;

program code configured to cause the computer to associate stack entry portions with the generated link information;

program code configured to cause the computer to accept input from a user to designate at least one of the stack entry portions; and program code configured to cause the computer to send the program the location of the relevant information associated with the designated stack entry portion.

32. The computer program product of claim 31 wherein at least one location of information relevant to the stack entry message comprises a program identifier.

33. The computer program of claim 32 wherein at least one location of information relevant to the stack entry message comprises a file identifier and file location information.

34. The computer program product of claim 33 wherein the file location information comprises a file line number.

35. The computer program product of claim 34 wherein the file location information additionally comprises a file column number.

36. The computer program product of claim 31 additionally comprising program code configured to cause the computer to display the stack entry message to the user.

37. The computer program product of claim 36 wherein the program code configured to cause the computer to display the stack entry message to the user comprises program code configured to cause the computer to highlight a portion of the stack entry message.

38. The computer program product of claim 36 additionally comprising program code configured to cause the computer to identify the display location of at least one displayed portion of the stack entry message.

39. The computer program product of claim 31 wherein the program code configured to accept input from a user comprises program code configured to receive user pointing devices status information.

40. The computer program product of claim 39 additionally comprising program code configured to relate the user pointing device status information to the display location of at least one displayed portion of the stack entry message.

* * * * *